July 21, 1936.    J. R. YANCEY    2,048,530
INSIDE PIPE CUTTER
Filed Dec. 14, 1934
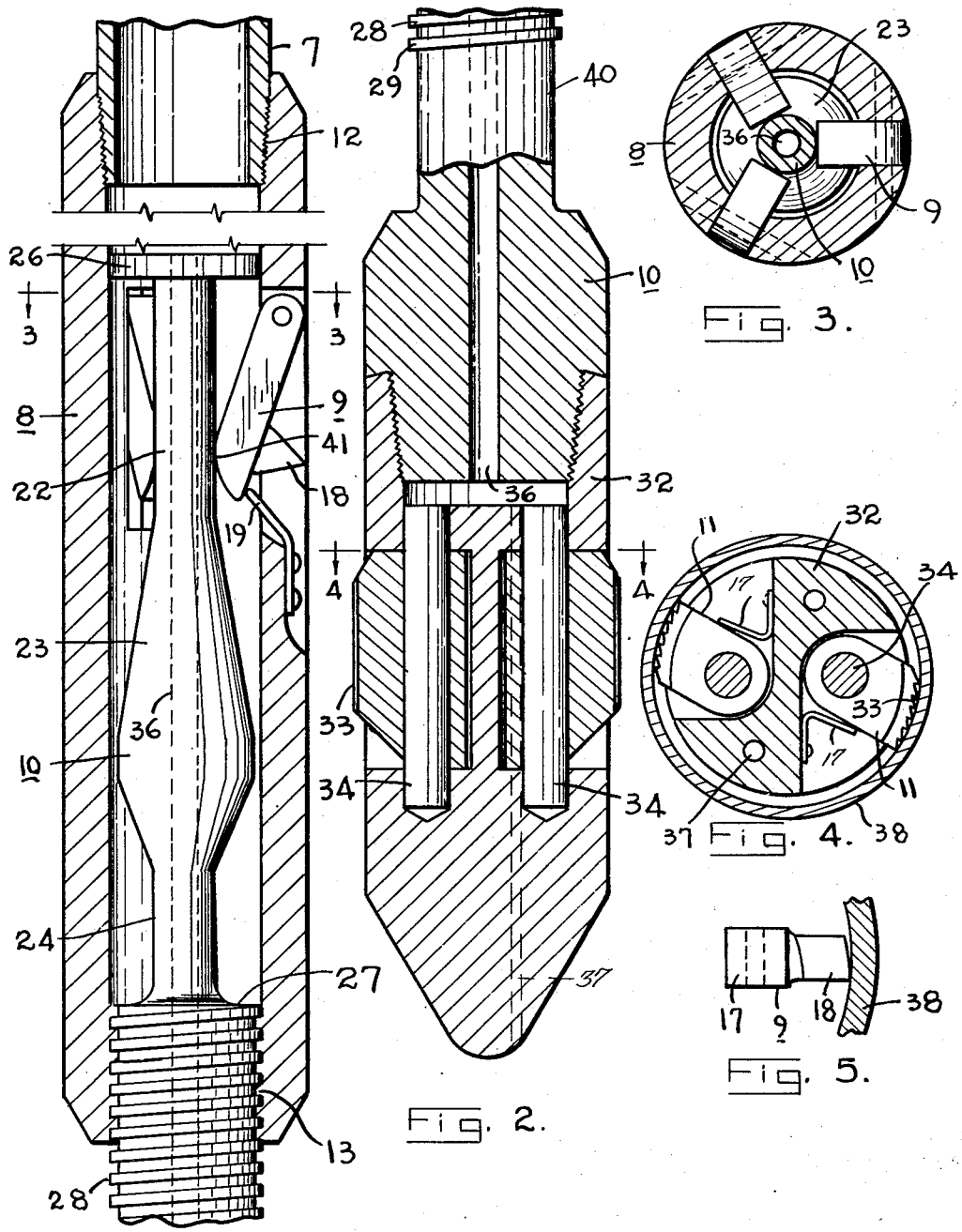
INVENTOR
J. R. YANCEY
BY Jesse R. Stone
Lester B. Clark
ATTORNEYS Patented July 21, 1936

2,048,530

UNITED STATES PATENT OFFICE 2,048,530

INSIDE PIPE CUTTER

John R. Yancey, Houston, Tex., assignor to Gray Tool Company, a corporation of Texas Application December 14, 1934, Serial No. 757,445

8 Claims. (Cl. 81—195)

The invention relates to inside pipe cutting tools of the type having cutters adapted to be rotated and expanded within a pipe to sever it.

An object of the invention is to provide an inside pipe cutting tool wherein the tool may be rotated, and the cutters extended and retracted without moving the tool longitudinally of the pipe to be cut.

It is another object of the invention to provide an inside pipe cutting tool in which the cutters are extended by a tapered mandrel and caused to collapse after passing the point of maximum expansion.

Still another object of the invention is the provision of a mandrel for actuating pipe cutters which not only extends the cutters, but is formed to permit the collapse of the cutters after they have been extended.

Another object of the invention is to provide a mandrel for pipe cutting tools which is threaded into the body of the tool and is held against rotation in one direction by jaws longitudinally slidable within the pipe to be cut.

Still another object of the invention is the provision of a cutting tool which, after being lowered to the desired depth, needs only to be rotated to perform its complete cutting operation and in which the cutters collapse to a safe position for removal.

These and other objects will be apparent when the following description is read in connection with the accompanying drawing, wherein:

Fig. 1 is a side elevation, partially in section, showing the upper portion of the tool.

Figure 2 is a similar view showing the lower portion of the tool.

Fig. 3 is a transverse sectional view taken on the line 3—3 of Fig. 1.

Fig. 4 is a transverse sectional view taken on the line 4—4 of Fig. 2 and showing the tool within a casing.

Fig. 5 is a top plan view of one of the cutters showing its position when contacting the interior of a casing to be cut.

In pipe cutting operations it is desirable that the cutters expand and engage the pipe at only one point along its length in order that the removal of a minimum amount of metal will sever the pipe. It is also desirable to provide a feed for the cutters which does not depend on a careful raising or lowering of the entire operating string of pipe during the cutting operation, or on a delicate adjustment and control of fluid pressure. I aim to provide such a tool.

My improved cutter is adapted to be secured to the lower end of a length of drill stem or operating pipe 7. The body 8 of the cutter is a tubular member acting as a housing for the cutters and the operating mandrel. The upper end of said body is threaded for engagement with the drill stem and the lower end is formed with a coarse heavy thread at 13 to engage with the threaded portion 28 of the mandrel 10.

The cutters 9 are mounted within slots in the side of the body 8 and I prefer to employ a plurality of cutters, the present embodiment showing three thereof, as will be seen from Fig. 3. The cutter 9 includes a dog pivoted at its upper end within the walls of the slot in which it is mounted and extending downwardly within the body. At the lower end of each dog is an outwardly extended blade 18 sharpened to engage with the pipe to be cut. The inner side of the dog is rounded at 41 to contact with the mandrel by which it is expanded. The dogs are held in retracted position within the body by means of springs 19 secured in recesses at the lower ends of the slots and bearing against the lower ends of the dogs in such manner as to hold them normally in retracted position.

The mandrel 10 extends upwardly to a point above the dogs and is provided at its upper end with a radial guide member 26 adapted to fit against the inner walls of the cutter body and hold the mandrel in centrally aligned position. The upper end of the mandrel adjacent the guide member is of cylindrical construction, as shown at 22. The cutters in retracted position normally bear against the cylindrical portion. Below the cylindrical portion of the mandrel the mandrel is flared outwardly at 23 to provide an expanding portion to contact with and move the dogs outwardly in operation. Below the flaring portion the mandrel is cylindrical for a short distance and then is tapered downwardly to merge with the cylindrical portion 24 at the lower end.

Below the cylindrical portion 24 is the threaded member 28 which has an upper shoulder 27. Below the threaded area the mandrel is reduced slightly in diameter below the lowermost thread 29, as shown at 40, forming a neck which connects the same with a lower head 10. The head 10 is provided with a downwardly tapered threaded end which engages within a socket in the upper end of the anchor 32. The anchor 32 is shown as a solid block of metal, the lower end of which is tapered so that it may be easily inserted into the well. There are shown two opposite recesses in the side of the block which house the pipe engaging jaws 11. Said jaws are pivotally mounted upon upright pins or shafts 34 so that they may have a rotative movement thereon. The outer faces of the jaws are toothed at 33, said teeth being inclined in a forward direction relative to the rotation of the tool so as to engage within the casing 38, as shown in Fig. 4. The jaws are held in casing engaging position by means of springs 17 secured to the side walls of the recesses and bearing against the sides of the jaws. As will be noted, these jaws are adapted to resist rotation in one direction but will slip against the wall of the casing when rotated in the opposite direction.

Fluid is adapted to circulate longitudinally of the mandrel and anchor by means of a passage 36 through the mandrel. This passage discharges into the lower end of the threaded socket in the anchor and passes downwardly through the anchor by means of water-ways 37, shown in Fig. 4.

When the device is to be operated it is lowered into the pipe to be cut and suspended to bring the knives at the point where the cut is to be made. When thus suspended the tool is rotated in a righthand direction so as to engage the dogs 11 with the pipe to be cut. This engagement of the dogs will hold the anchor 10 against rotation but as the teeth upon the dogs 11 are formed longitudinally of the anchor said anchor will be able to move upwardly during the cutting operation. The pipe is then rotated to screw the mandrel upwardly to move the cutters outwardly against the pipe 38 and as the tool is rotated a cut will be made on the inner surface of the pipe. It is desired to form the threaded area 28 upon the mandrel of the proper pitch to advance the mandrel gradually so as to force the cutters progressively through the wall of the pipe to be cut until the pipe is severed. When this is done the central cylindrical portion of the mandrel will pass the cutter dogs and the dogs may then be moved inwardly away from the severed pipe and will drop into position below the expanding portion of the mandrel. At this point the threaded area 28 will have passed entirely up into the body of the tool with the unthreaded neck 40 adjacent the threaded portion upon the body. Further rotation of the tool will thus have no effect upon the dogs and the upper shoulder 27 upon the mandrel will be stopped short of engagement with the cutting dogs 9.

The advantages of this construction lie in the simple and rugged construction thereof whereby the cutters may be positively advanced into cutting engagement with the pipe and forced progressively therethrough by the mandrel 23. The cutters are then positively withdrawn from engagement with the severed pipe so that there is no possibility of injury to the dogs as the tool is withdrawn from the well.

The invention provides a cutting tool which is very simple in operation since it is only necessary to lower the tool to the desired depth and rotate it a sufficient number of turns to move the mandrel its full operative length. It may then be withdrawn with the assurance that the cut has been completed and that the cutter blades are collapsed.

What is claimed is:

1. An inside pipe cutting tool comprising a hollow body, a plurality of cutters carried by said body and adapted to be moved into and out of engagement with the pipe to be cut, a mandrel having a threaded portion engaging into the lower end of said body, jaws carried by said mandrel to engage the pipe and hold said mandrel against rotation therewithin in one direction only whereby said mandrel may be screwed into said body, a tapered section on said mandrel adapted to expand said cutters, a relieved portion beneath said tapered section into which said cutters may be collapsed and a relieved unthreaded section on said mandrel below the threaded portion to release the engagement between said mandrel and said body when said cutters are released.

2. In an inside pipe cutting tool comprising a hollow body, a mandrel longitudinally movable therein, cutters carried by said body, means on said mandrel to extend said cutters, interengaging screw threads on said body and mandrel whereby relative rotation will produce relative longitudinal movement, the threads on said mandrel being formed to disengage from said body when said cutters are fully extended and longitudinally slidable pipe-engaging means carried by said mandrel to support it against rotation in one direction while said body is rotated.

3. An inside pipe cutting tool comprising a hollow body, cutter dogs positioned in the wall of said body, cutter blades on said dogs, said blocks being pivoted whereby said cutter blades may be moved substantially radially in said body into and out of engagement with the pipe to be cut, springs urging said dogs to a retracted position, a mandrel threaded into the lower end of said body and adapted to be advanced upwardly into said body by relative rotation of said body, a relieved unthreaded portion on said mandrel below the threaded portion, a smoothly tapered portion on said mandrel engaging said cutter dogs and formed to move said cutter blades outwardly as the mandrel is advanced into said body, a relieved portion on said mandrel below said first portion into which said dogs may be moved after the cutter blocks have traversed the tapered portion, said mandrel being then released from its threaded engagement with said body, pipe engaging jaws carried by said mandrel and adapted to hold said mandrel against rotation in a righthand direction within the pipe to be cut.

4. In an inside pipe cutter, a hollow body, means for rotating said body, cutter dogs mounted pivotally in slots in said body, inner rounded surfaces on said dogs, cutting blades on said dogs, an inner mandrel in said body, a threaded connection between said body and mandrel at the lower end of said body, whereby relative rotation of said body will move said mandrel longitudinally in said body, a tapered enlargement on said mandrel to engage said rounded surfaces on said dogs and move said blades outwardly, means to limit relative longitudinal movement of said mandrel in said body and still allow relative rotation, and means to hold said mandrel against rotation in said pipe in one direction.

5. In an inside pipe cutter, a hollow body, means for rotating said body, cutter dogs mounted pivotally in slots in said body, inner rounded surfaces on said dogs, cutting blades on said dogs, an inner mandrel in said body, a threaded connection between said body and mandrel at the lower end of said body, whereby relative rotation of said body will move said mandrel longitudinally in said body, a tapered enlargement on said mandrel to engage said rounded surfaces on said dogs and move said blades outwardly, said threaded connection on said mandrel being terminated and said mandrel being relieved to render the connection ineffective when said mandrel has moved a predetermined amount in said body, and means to anchor said mandrel against rotation in one direction.

6. In an inside pipe cutter, a hollow body, means to communicate rotation thereto, cutter dogs mounted in slots in said body, a mandrel in said body adapted to engage said cutters, means to hold said cutters resiliently against said mandrel, a smoothly tapered area on said mandrel to engage said cutters, a coarsely threaded area on said mandrel spaced from said tapered area to engage the threaded lower end of said body, means to hold said mandrel against rotation in one direction while said body is rotated to move said mandrel to expand said cutters, said threaded area being of predetermined length, said mandrel being relieved adjacent said threaded area so that the threaded engagement with the body is released when said mandrel has been advanced a predetermined distance whereby continued rotation of said body will not affect said mandrel.

7. In an inside pipe cutter, a hollow body, means to communicate rotation thereto, cutter dogs mounted in slots in said body, a mandrel in said body adapted to engage said cutters, means to hold said cutters resiliently against said mandrel, an area of enlarged diameter on said mandrel smoothly tapered on its ends to engage said cutters to advance them to cutting position, said cutters being retracted when said enlarged area has passed the same, a coarsely threaded area on said mandrel spaced from said tapered area to engage the threaded lower end of said body, means to hold said mandrel against rotation in one direction while said body is rotated to move said mandrel to expand said cutters, said threaded area being of predetermined length, said mandrel being relieved adjacent said threaded area so that the threaded engagement with the body is released when said mandrel has been advanced a predetermined distance whereby continued rotation of said body will not affect said mandrel.

8. In an inside pipe cutting tool, a rotatable body, pipe cutters carried thereby, a mandrel, an enlarged area thereon smoothly tapered at both ends to expand said cutters, means to hold said mandrel against rotation in one direction, said means being longitudinally movable in the pipe to be cut, means to withdraw said cutters and a threaded connection between said mandrel and said body spaced from said enlarged area, said threaded connection being of predetermined length, the outer diameter of said mandrel being relieved at the end of said threaded connection whereby the threads are disengaged after a predetermined number of revolutions.

JOHN R. YANCEY.